United States Patent

Kunisch et al.

[11] Patent Number: 6,052,437
[45] Date of Patent: Apr. 18, 2000

[54] SUBSCRIBER TERMINAL CIRCUIT FOR CONNECTING AN ANALOG SUBSCRIBER LINE TO A DIGITAL SWITCHING CENTER

[75] Inventors: Paul Kunisch, Puchheim; Roland Krimmer, Germering, both of Germany

[73] Assignee: Siemens Aktiengesellschaft, Munich, Germany

[21] Appl. No.: 08/933,532

[22] Filed: Sep. 18, 1997

[30] Foreign Application Priority Data

Sep. 27, 1996 [DE] Germany .......................... 196 39 885

[51] Int. Cl.[7] ............................. H04M 1/24; H04M 3/08; H04M 3/22
[52] U.S. Cl. ..................................... 379/2; 379/1; 379/399
[58] Field of Search .................................. 379/1, 2, 5, 27, 379/29, 412, 399; 370/355; 361/119

[56] References Cited

U.S. PATENT DOCUMENTS

| | | | |
|---|---|---|---|
| 4,807,277 | 2/1989 | Perry | 379/29 |
| 5,323,460 | 6/1994 | Warner et al. | 379/412 |
| 5,392,327 | 2/1995 | Galpin | 379/2 |
| 5,404,389 | 4/1995 | Fukuda et al. | 379/27 |
| 5,483,573 | 1/1996 | Steenton et al. | 379/2 |
| 5,537,287 | 7/1996 | Dreir | 361/119 |
| 5,677,941 | 10/1997 | Rice | 379/2 |

FOREIGN PATENT DOCUMENTS 35 34 861 C2  9/1985  Germany .

Primary Examiner—Paul Loomis
Attorney, Agent, or Firm—Hill & Simpson

[57] ABSTRACT

An interface circuit with integrated test functions relating to the subscriber line, with a test circuit realized in the simplest case by an ohmic resistance, and comprising a relay circuit having two changeover contacts by means of which in one switching position the leads of the subscriber line are connected with the interface circuit, and in the other switching position the subscriber line is disconnected and the test circuit is connected to the interface circuit.

11 Claims, 1 Drawing Sheet

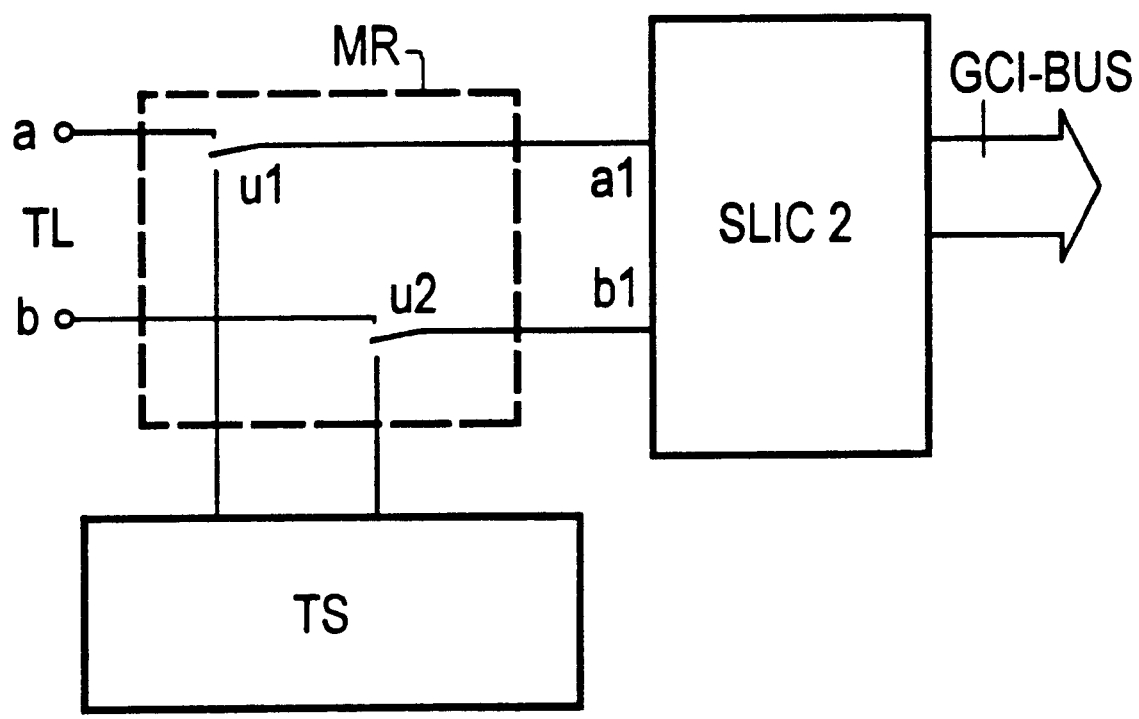

SUBSCRIBER TERMINAL CIRCUIT FOR CONNECTING AN ANALOG SUBSCRIBER LINE TO A DIGITAL SWITCHING CENTER

BACKGROUND OF THE INVENTION

1. Field of the Invention

The present invention relates generally to the field of telecommunications systems, and, more particularly, the present invention relates to a subscriber terminal circuit for connecting an analog subscriber line to a digital time-division multiplex telephone switching center.

2. Description of the Related Art

Despite the trend in subscriber terminal circuits of modem digital time-division multiplex telephone exchanges towards systems that are as completely semiconductor-based as possible and the increasing integration of the components, there remain functions which up to now have always been embodied in devices using relays. This is primarily due to technological reasons and reasons of cost. These devices include devices which perform switch off functions in which the leads of the subscriber line are disconnected from the subscriber terminal circuit. A disconnection of this sort is related to the performance feature "Precut over," in which, during installation of a new central office, entire groups of subscriber terminal circuits have to be disconnected from the main distributor. It is also related to the performance feature "power cross," in which, due to the occurrence of impermissibly high interference voltages on a subscriber line, the line is disconnected from the subscriber terminal circuit in order to prevent effects of the over voltages on the semiconductor elements of the subscriber terminal circuit.

In addition, the test access of a testing apparatus to the subscriber terminal circuit and to the leads of the subscriber line also is a function realized by relays. In previous solutions, three separate relays were used for the above-mentioned relay functions. For example, one is used for the disconnection of the leads of the subscriber line in the functions precut over and power cross, and two relays are used in connection with the test access. One of which serves for the connection of the test apparatus to the subscriber terminal circuit with disconnection of the subscriber line from the inputs of the subscriber terminal circuit so that monitoring of the operation of the subscriber terminal circuit can be carried out. The other serves for the connection of the test apparatus to the subscriber line, as well as with disconnection of the subscriber line from the subscriber terminal circuit in order to enable a monitoring of the subscriber line to be carried out.

One goal of the present invention is to reduce the expense for realization of the mentioned relay functions. Other objects and advantages of the present invention will be apparent from the following summary and detailed description of the present invention.

SUMMARY OF THE INVENTION

In the subscriber circuit of the present invention, for the named relay function only a single changeover relay is required. This is thus a multifunctional relay. This is possible because the subscriber circuit is constructed in such a way that it can itself execute test functions. As a result, in the simplest case a resistor suffices as the test circuit that, according to the invention, is connected to the subscriber terminal circuit by means of the relay in connection with the execution of tests.

The present invention is explained in more detail on the basis of an exemplary embodiment, with reference to the drawings.

BRIEF DESCRIPTION OF THE DRAWINGS

FIG. 1 is a block diagram illustration of an exemplary embodiment of the present invention.

DETAILED DESCRIPTION OF THE PREFERRED EMBODIMENTS

FIG. 1 illustrates a subscriber terminal circuit with the interface part SLIC2, the multifunctional relay circuit MR, and a test circuit TS indicated. In practice, the interface part SLIC2 is sectioned into a high-voltage part and a low-voltage/signal processor part. In the high-voltage part, the functions of the feeding of the subscriber line with programmable feed characteristic in the idle state and the calling state, as well as the detection of the current on the leads a and b of the subscriber line, are essentially realized. Essential tasks of the low-voltage/signal processor module are the programmable determination of the relative transmission and reception level; the realization of a programmable input impedance; the carrying out of the 2/4 wire conversion with programmable simulation impedance, and the coding/decoding of the speech signals.

In the subscriber terminal circuit of the present invention, in the interface part SLIC2, apart from the named functions, test functions are also realized. These relate to, besides a self-test of the subscriber terminal circuit, the monitoring of the subscriber line for line interruption or ground faults of the line leads, as well as monitoring of the subscriber terminal apparatus connected to the subscriber line.

The multifunctional relay MR provided according to the present invention comprises two changeover contacts u1 and u2, by means of which the a-lead and the b-lead of the subscriber line are disconnected from the inputs a1 and b1 of the interface part SLIC2 of the subscriber terminal circuit. In place of this, the inputs a1 and a2 can be connected with a test circuit TS. In the simplest case, the test circuit TS can consist of a single resistor, by means of which, in case of connection, the inputs a1 and b1 of the interface part SLIC2 of the subscriber circuit are connected with one another.

The multifunctional relay circuit serves on the one hand to disconnect the subscriber terminal circuit or, respectively, the part SLIC2 thereof, from the leads of the subscriber circuit, in connection with performing the functions precut over and power cross. The circumstance that, in this context, the test circuit TS is applied to the inputs a1 and b1 of the subscriber terminal circuit with the disconnection is of no consequence.

In connection with the carrying out of tests by means of the test functions integrated in the interface part SLIC2 of the subscriber terminal circuit, first, for the execution of a self-test by means of actuation of the multifunctional relay MR, the leads of the subscriber line are disconnected from the inputs a1 and b1. The test circuit is connected to these inputs, which in the above-named simplest case of its embodiment effects only a connection of the inputs a1 and b1 via a resistor. For the execution of more complex self-tests, the test circuit can also have a more expensive construction. Specifically, for example, it may present a passive network with complex resistance behavior.

For the execution of the actual tests relating to the subscriber line and the subscriber terminal apparatus, in the other switching position of the multifunctional relay circuit MR the leads a and b of the subscriber line are again connected to the inputs a1 and a2, while on the other hand the test circuit TS is disconnected and is out of operation in this stage of the test.

In embodiments of the terminal region of a digital telephone exchange in which the subscriber terminal circuits are combined group-by-group, the test circuit can be present only per individual group rather than per individual line, in which case a test bus internal to the group is present, to which the test circuit individual to the group is applied and with which the multi-functional relay circuits individual to the lines produce a connection.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for operating a subscriber terminal circuit in a digital time-division multiplex telephone exchange, comprising the steps of:

providing a subscriber terminal circuit with an interface circuit and a single multifunctional changeover relay, and providing said relay with two changeover contacts allowing connection to a test circuit and to leads of subscriber lines;

configuring said interface circuit to conduct test functions;

signaling said relay in response to a test request;

disconnecting said interface circuit from leads of a subscriber line that is connected to said interface circuit by utilizing said two changeover contacts of said relay;

connecting said interface circuit to a test circuit utilizing said two changeover contacts of said relay; and executing said test functions within said interface circuit upon said test circuit.

2. The method of claim 1, further comprising:

signaling said relay;

connecting said interface circuit to said leads of subscriber lines; and executing said test functions upon said subscriber lines.

3. The method of claim 1, further comprising the steps of:

signaling said relay;

connecting said interface circuit to said leads of subscriber lines; and executing said test functions upon line leads of said subscriber lines.

4. A method for operating a subscriber terminal circuit in a digital time-division multiplex telephone exchange, wherein said subscriber terminal circuit comprises an interface circuit and a single multi-functional changeover relay, said relay having two changeover contacts allowing connection to a test circuit and to leads of subscriber lines, and said interface circuit having test functions, said method for operating said subscriber terminal circuit comprising the steps of:

monitoring said subscriber lines for a condition of impermissibly high interference voltages;

signaling said single relay in response to said condition;

disconnecting said interface circuit from leads of a subscriber line that is connected to said interface circuit by utilizing said relay's two changeover contacts;

connecting said interface circuit to a test circuit utilizing said relay's two changeover contacts.

5. A method for operating a subscriber terminal circuit in a digital time-division multiplex telephone exchange, wherein said subscriber terminal circuit comprises an interface circuit and a single multi-functional changeover relay, said relay having two changeover contacts allowing connection to a test circuit and to leads of subscriber lines, and said interface circuit having test functions, said method for operating said subscriber terminal circuit comprising the steps of:

signaling said single relay prior to a deactivation of an entire group of subscriber terminal circuits from a main distributor;

disconnecting said interface circuit from leads of a subscriber line that is connected to said interface circuit by utilizing said relay's two changeover contacts;

connecting said interface circuit to a test circuit utilizing said relay's two changeover contacts.

6. The method of claim 4, wherein said test circuit comprises a single resistor.

7. The method of claim 4, wherein said test circuit comprises a passive network with complex resistance behavior.

8. The method of claim 5, wherein said test circuit comprises a single resistor.

9. The method of claim 5, wherein said test circuit comprises a passive network with complex resistance behavior.

10. A method for operating a subscriber terminal circuit in a digital time-division multiplex telephone exchange, comprising the steps of:

providing a subscriber terminal circuit with an interface circuit and a single multi-functional changeover relay, and providing said relay with two changeover contacts allowing connection to a test circuit and to leads of subscriber lines;

configuring said interface circuit to conduct test functions;

signaling said relay in response to a test request;

disconnecting said interface circuit from leads of a subscriber line that is connected to said interface circuit by utilizing said two changeover contacts of said relay;

connecting said interface circuit to a test circuit utilizing said two changeover contacts of said relay; and executing said test functions within said interface circuit upon said test circuit; and wherein said test circuit comprises a single resistor.

11. The method of claim 1, wherein said test circuit comprises a passive network with complex resistance behavior.

* * * * *